United States Patent [19]

Maxon et al.

[11] 3,955,002
[45] May 4, 1976

[54] ROTISSERIE POULTRY

[75] Inventors: Steven T. Maxon, Downers Grove, Ill.; Michael Sebring, Phoenix; Donald H. Ryan, Paradise Valley, both of Ariz.

[73] Assignee: Armour and Company, Phoenix, Ariz.

[22] Filed: July 21, 1972

[21] Appl. No.: 273,948

[52] U.S. Cl. .............................. 426/132; 426/644; 17/45; 426/420; 426/480
[51] Int. Cl.² ........................................ A22C 18/00
[58] Field of Search .............. 99/117; 17/13, 11, 45, 17/420; 426/132, 644; 420/480

[56] References Cited
UNITED STATES PATENTS
2,842,443  7/1958  Rice et al. .......................... 99/107

OTHER PUBLICATIONS

Lord, "Everybody's Cookbook," 1924, published by Harcourt Brace & Co., New York, p. 611, article entitled *To Truss a Chicken Fowl or Turkey.*

Given, "Modern Encyclopedia of Cooking", Vol. II, 1949, published by J. G. Ferguson & Associates, Chicago, p. 1192, article entitled *Trussing Poultry for Roasting.*

*Primary Examiner*—Raymond N. Jones
*Assistant Examiner*—R. A. Yoncoskie
*Attorney, Agent, or Firm*—Frank T. Barber; Carl C. Batz

[57] ABSTRACT

A method of trussing a poultry carcass including folding the neck skin over the back of the carcass, placing the central part of a cord over the neck skin and passing the end portions of the cord over the wings, about the body, under the keel and back on the other side of the body, tying the cord over the neck skin. A modified trussing method includes making a slit in the skin of the body of the carcass, tucking the end of the humerus section of the wing into this slot and, if desired, binding the wing section in position by placing a cord over the wing section, suitably over the body skin covering the end of this section.

6 Claims, 7 Drawing Figures

ROTISSERIE POULTRY

This invention relates to a method of preparing a poultry product and to the product so prepared. The invention relates particularly to a method of trussing a poultry carcass so as to bind the wings in an effective way.

BACKGROUND

It is important especially in the preparation of poultry for cooking on a rotisserie that the carcass be compact and that the wings not be allowed to extend outwardly away from the body of the carcass. Further, when the neck of the poultry is removed this leaves a substantial amount of skin which is loose and tends to hang in an unsightly fashion and may get overcooked.

The irregular shape of the carcass makes it hard to bind, and bindings which have heretofore been made tend to be ineffective to hold the wings in place and tend to become undone especially as the carcass is turned in the course of its rotation on a rotisserie. Further, the ends of the wings, or the ends of the wing portions, if any joints are removed, tend to punch through the plastic bags ordinarily used in packaging the poultry.

Therefore it is an object of the present invention to provide improved methods for packing poultry to avoid the above difficulties, which methods are practicable and can be performed economically and effectively in a commercial packing plant. More specific objects will become apparent as this specification proceeds.

DRAWINGS

Embodiments of our invention are illustrated in the accompanying drawings in which.

DETAILED DESCRIPTION

As illustrated in FIGS. 1–4, C designates a poultry carcass which may be chicken, turkey or other fowl. The invention is particularly adapted to a small turkey. As here shown, the feathers, entrails, head, neck and feet have been removed. If desired, the tips of the wings may also be removed.

Figure 1:
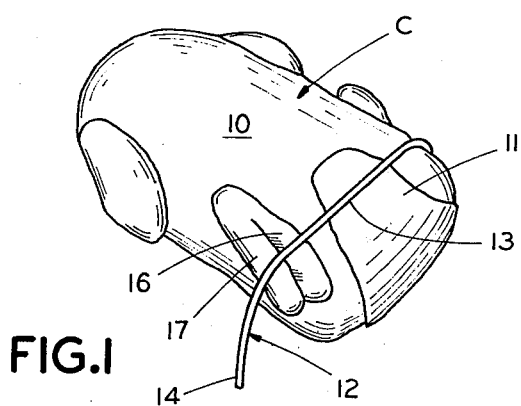
FIG. 1 is a perspective view of a poultry carcass at the beginning of the trussing operation with the carcass lying on its breast.

As shown in FIG. 1, the carcass is on its breast with the back portion 10 of the body upwards. At the beginning of the trussing operation the operator may grasp the loose neck skin 11 and fold it over the back of the carcass as shown in FIG. 1.

Then the operator may place a cord 12 over the carcass with a central portion of the cord 13 over the neck skin 11, and turn the end portions 14 and 15 downwardly on each side of the carcass, over the wing. The wing of pountry has three sections, the section which is attached to the body is called "humerus", the section which is attached to the humerus is called "radius-ulna" and the third or end section which is attached at the other end of the radius-ulna is called the "wing tip". As shown in the drawings, the wing tip section has been removed. Accordingly, when the operator brings the cord down on each side of the carcass the cord is passed over both the humerus section 16 and the radius-ulna section 17 of the wings.

Figure 3:
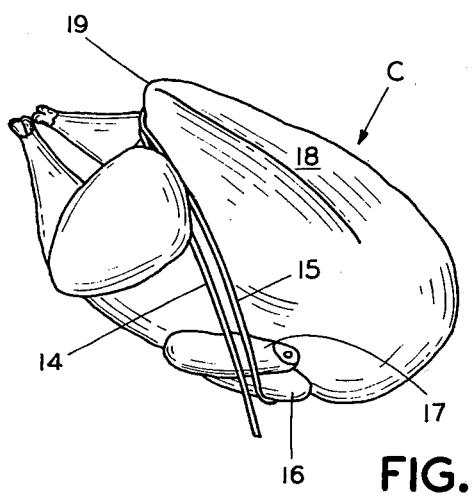
FIG. 3 is a view like FIG. 2 except showing the cord disposed about the breast under the end of the keel bone and back over the wing portions.
Figure 4:
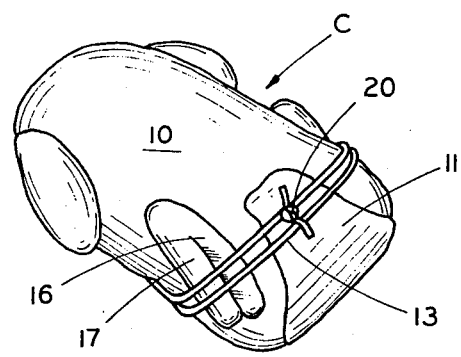
FIG. 4 is a view of the poultry carcass with the carcass turned again to rest on its breast and with the ends of the cord tied on the back.

Then the carcass is turned over to rest on its back with the breast portion 18 upward. The end portions of the cord are each then passed across the breast and in different directions under the keel 19 of the breast, after which each end portion of the cord is passed downwardly on the other side of the body of the carcass, again across the radius-ulna and humerus sections of the wings, to the back of the carcass (FIG. 3). The carcass then may be turned over so as to have its back upward, and the ends of the cord tied in knot 20 over the skin 11.

The product so prepared is secure with no wing sections extending away from the body and with the neck skin bound against the body where it gives good conformation to the product and does not burn during cooking on a rotisserie.

Figure 5:
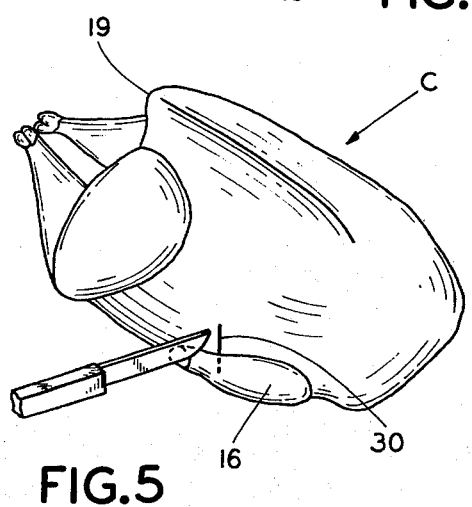
FIG. 5 shows a modification of the invention as a slit is being made under the wing portion.
Figure 6:
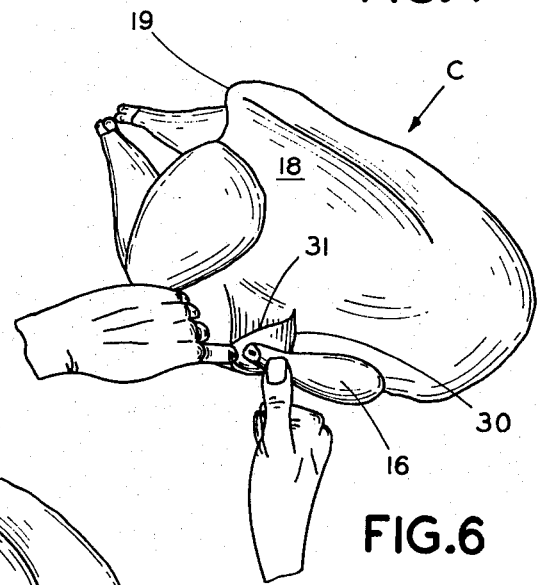
FIG. 6 is a view like FIG. 5 but showing the wing portion being tucked into the slit.
Figure 7:
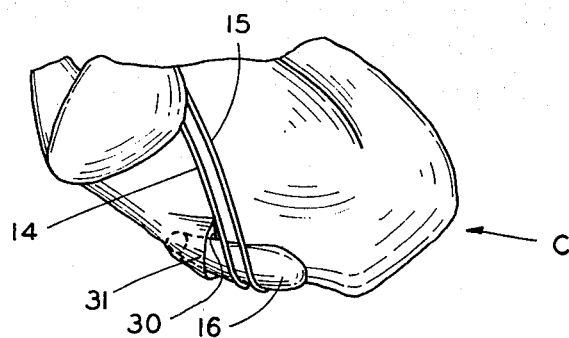
FIG. 7 is a broken view, like FIG. 5, but showing a cord in place over the wing portion.

Another modification of the invention is illustrated in FIGS. 5–7 wherein the same poultry carcass is shown as in FIGS. 1–4 except that the radius-ulna section of the wing has been removed along with the wing tip section, leaving only the humerus section 16 extending from the body of the carcass. Such removal is accomplished by severing the wings of the poultry between the humerus and the radius-ulna sections.

According to this modification, the operator makes a slit 30 in the skin of the body under the humerus section of the wing, the slit being transverse of the humerus section and inward of the end of that section. Then, as illustrated especially in FIG. 6, the operator pulls back the skin 31 at the rearward side of the slit, thus stretching the skin and bringing it under tension while providing an opening through which the operator may tuck in the end of the humerus section with his other hand. When the operator releases his hold on the skin 31, this skin, by its own elasticity, comes into place over the end of the humerus section as shown in FIG. 7. The end of the humerus section is thus hidden and held in place. In this condition the end of the bone of this wing section cannot injure the bag in which the poultry is packaged or catch on any objects as the poultry is turned on a rotisserie. Further, this packing process provides a neat appearance which adds to its marketability.

Figure 2:
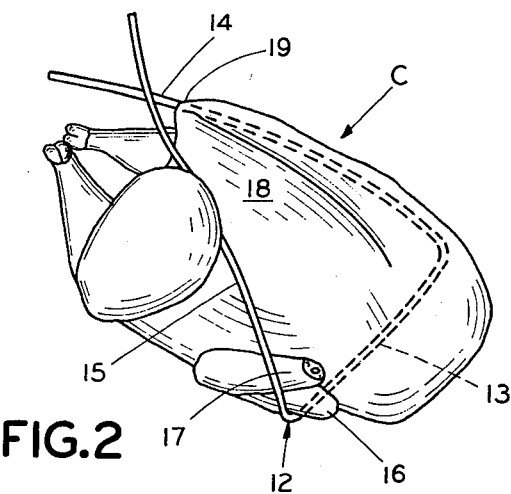
FIG. 2 is a view of the poultry carcass lying on its back with the trussing cord passed about the body of the carcass.

After the wing has been tucked into the slit in the skin the carcass may, if desired, be wrapped with cord in the manner described in connection with FIGS. 1–3 with the cord portions 14 and 15 extending over the humerus section of the wing and preferably over the skin which extends over the end portion of this section.

While we have illustrated and described in detail only certain modifications of our invention it is understood that the invention is subject to wide variation and embodiment in many forms, and that many changes may be made, all within the spirit of the invention and within the scope of the appended claims.

We claim:

1. In a method of preparing a poultry product the steps of severing a wing of a poultry carcass between the radius-ulna and humerus sections to remove the radius-ulna section of the wing from the carcass, making a slit in the skin of the body of the carcass at a point under the humerus section of said wing and inward of the end of said humerus section, stretching the slit skin while tucking said end under the slit skin, and releasing said skin to permit the same to draw over said end.

2. A method as set forth in claim 1 including the step of passing a cord about the body of said carcass and over said humerus section to bind said section against removal from engagement with said slit.

3. A method as set forth in claim 2 in which said cord extends over said humerus section and over the skin disposed over said section.

4. A poultry product comprising a poultry carcass having a slit in the skin of the body of the carcass at a point inward of the end of the humerus section of a wing of the poultry carcass, the end of said humerus section extending through said slit and under the skin adjacent to the slit.

5. A poultry product as set forth in claim 4 including a cord extending about the poultry carcass and over said humerus section of said wing.

6. A poultry product as set forth in claim 4 including a cord which extends over the skin over said end of said humerus section.

* * * * *